B. T. Trimmer.

Smut Mill.  
2 Sheets--Sheet 1.

No. 120,012.

Patented Oct. 17, 1871.

Witnesses.  
R. F. Osgood  
Arch'd Baine

Inventor.  
B. T. Trimmer  
By Burke Fraser & Osgood  
Att'ys  
Rochester  
N.Y.

B. T. Trimmer.             Smut Mill.
2 Sheets--Sheet 2.
No. 120,012.
Patented Oct. 17, 1871.
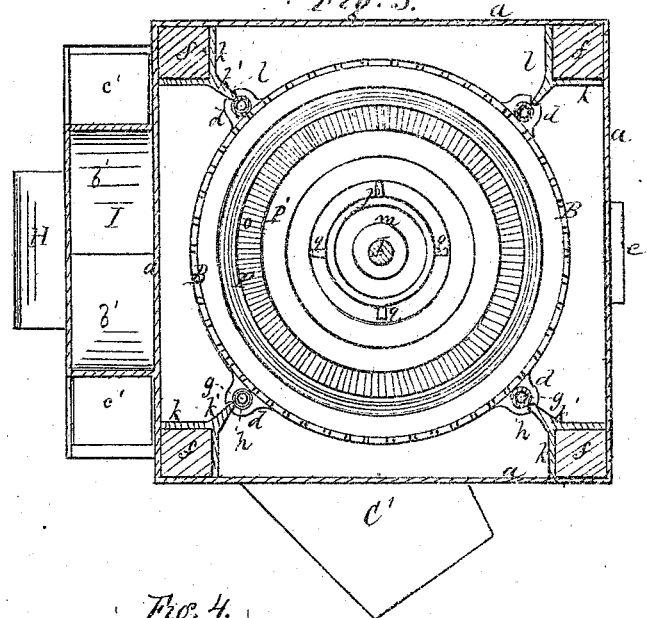
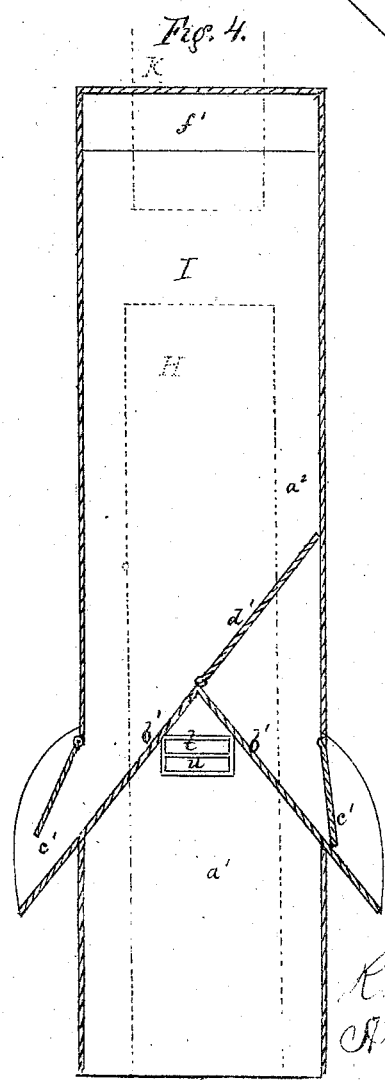
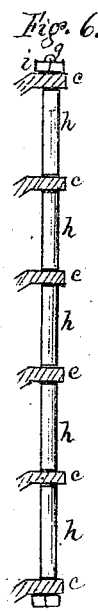
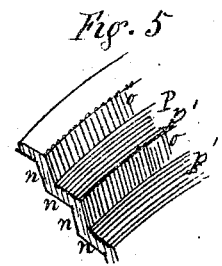
Witnesses          Inventor.

ature. J is the spindle, driven by a pulley, b,
UNITED STATES PATENT OFFICE.

BENJAMIN T. TRIMMER, OF ROCHESTER, NEW YORK.

IMPROVEMENT IN SMUT-MILLS AND GRAIN-CLEANERS.

Specification forming part of Letters Patent No. 120,012, dated October 17, 1871.

*To all whom it may concern:*

Be it known that I, BENJAMIN T. TRIMMER, of the city of Rochester, in the county of Monroe and State of New York, have invented a certain new and useful Improvement in Smut-Mills and Grain-Cleaners, of which the following is a specification:

This invention consists in the construction and arrangement of the machine, as hereinafter described.

Figure 1:
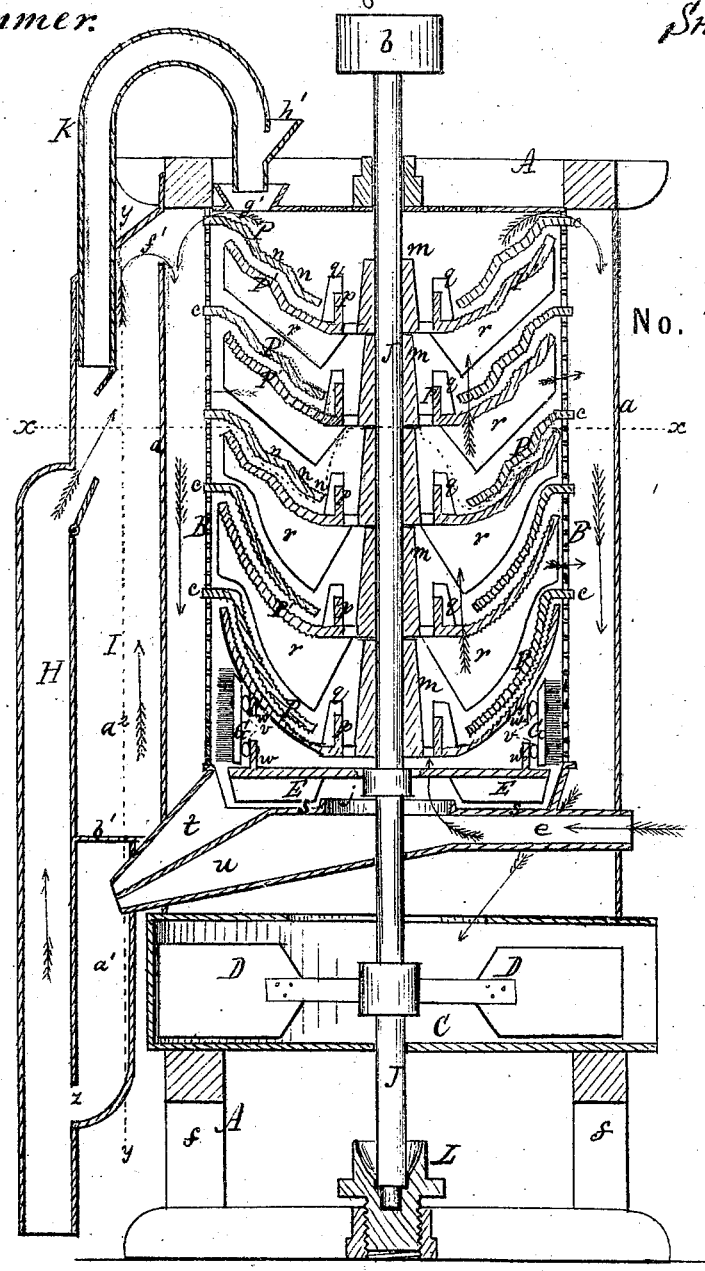
Figure 2:
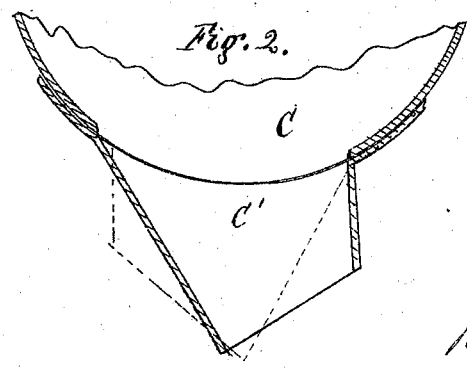

In the drawing, Figure 1 is a central vertical section of my machine; Fig. 2, a view showing the shifting-spout of the fan-case; Fig. 3, a horizontal section in the line $x\ x$, Fig. 1; Fig. 4, a vertical section of the trunk, in line $y\ y$ of Figs. 1 and 3; Fig. 5, a view of a portion of one of the stationary beaters; Fig. 6, a diagram showing the method of connecting and sustaining the stationary beaters.

A represents the frame of the machine, and $a\ a\ a\ a$ the four closed sides which inclose the operating parts. B is the perforated cylinder, similar to those used in other machines of a like nature. J is the spindle, driven by a pulley, $b$, located either at the top or bottom. C is the fan-case, located at the bottom, and D is the exhaust-fan that plays therewith. C′ is a shifting spout or mouth to the fan-case. It may be bolted or otherwise attached, so as to be removed at pleasure and reversed or turned in the opposite direction, as indicated by the black and dotted lines, Fig. 2. By this means the fan may be made to revolve in either direction, which adapts the machine to being placed in any desired position. This shifting spout forms one feature of my invention. P P are the stationary, and P′ P′ the revolving beaters. The former are built into the walls of the perforated cylinder, which latter is made up of sections or rings which rest one on top of another, with the flanges $c\ c$ of the beaters interposed between. To retain these in place four lugs, $d\ d\ d\ d$, Fig. 3, are cast on each of the flanges of the beaters, which come in line with the posts $f\ f\ f\ f$ of the frame. Holes are formed in these lugs, through which pass rods $g\ g\ g\ g$. Sections $h\ h$ of gas-pipe or other tube are placed around these rods, resting between the lugs, and the whole are clamped by nuts $i\ i$. This arrangement is shown most clearly in Fig. 6. By this means the whole are clamped and stiffened firmly in place. Angle-irons $k\ k\ k\ k$ are also secured to the posts, having points $k'\ k'$, which fit in notches $l\ l$ of the lugs, and thus stay or brace the beaters firmly in place. This arrangement of the sections of tubing and stay-irons also forms a feature of my invention, being very simple and effective for holding the beaters and perforated cylinder in place. The revolving beaters P′ P′ are made fast to the spindle by means of hubs $m\ m$, and revolve with it, as clearly shown in Fig. 1. These hubs, by abutting together, secure the whole firmly in place, and the beaters adjust up and down with the spindle. In order that these hubs may pass from top to bottom, a central opening is made in each of the stationary beaters. Both sets of beaters are formed in zigzag form, or in alternate vertical and horizontal steps $n\ n$, as shown most clearly in Fig. 5. The vertical steps are formed with vertical corrugations or ribs $o\ o$, while the horizontal ones are formed with circumferential corrugations or ribs $p'\ p'$, the object of which will be presently stated. These steps of the fixed and revolving beaters coincide or come in line, so that they may be adjusted up or down bodily with the spindle, to adapt the spaces between the beaters to the kind or conditions of the grain to be cleaned. It will also be noticed that as the extreme periphery of the revolving beaters stands upright, it may be closed up as closely as desired to the surface of the stationary beaters, and thus the grain be retained as long as required between them before escaping over. This is of especial service in hulling rice, which requires a good deal of action. The corrugations of the beaters being located in reverse directions, as above described, are of especial advantage in giving a rotating or turning action to the grains in passing through. The grains are made to turn over and over by contact with these corrugations, and thus are subject to friction upon all sides, which would not be the case if the ribs ran one way. The succession-steps or zigzags of the beaters also serve to turn over the grains in passing through, and retain them a considerable time before escaping. These corrugations are formed on both sides of the beaters instead of one, as has been heretofore done, thus obtaining double action. In some cases I make the beaters of the concave form shown at the bottom in Fig. 1. The corrugations in this case have the same effect of giving an intense action to the grain in passing through. The arrangement of the beaters, as above described, also forms one feature of my invention. The revolving beaters are formed with upright rings or thimbles $p\,p$ outside the hubs, which serve as stops to prevent the grain which drops from the edges of the stationary beaters from passing inward and escaping through the openings around the hubs. These rings have also small upright fans $q\,q$, which drive the grain outward and force it up the passages between the beaters again. By this means the central portion of the revolving beaters is kept clear of the grain, and an active circuit is attained. Wings or fans $r\,r$ are also formed on the under side of the revolving beaters, between them and the stationary ones, the object of which is to drive the grain around through the spaces in a circumferential direction, thus insuring an equal and uniform action; also giving additional agitation, and driving the dust through the perforated cylinder. These features, combined with the revolving beaters, I also consider new. E is a small fan or scraper located beneath the beaters sweeping over a floor, $s$, and driving the cleaned grain through a spout, $t$, into the air-trunk. This floor has a central passage, $j$, and beneath this is an air-tube or passage, $e$, which admits the induction-air to the machine; and also a spout-passage, $u$, which forms a continuation of the air-passage and delivers such grain as falls through into the same trunk with the spout $t$ above. In fact the passages $t\,u$ are a single spout divided only by a partition. The induction air that enters at $e$ passes up, as indicated by arrows, through the perforated cylinder; thence passes partially up over the top of said perforated cylinder, and partially through the perforations of the sides of the same; thence passes down the jacket-space between the perforated cylinder and the outer casing $a\,a$, and finally enters the top of the fan-case, where it is driven out, as before described. I know of no other machine where the air is carried through in this manner. By this long circuit and the ready escape outward on every side the dust has a rapid egress, which insures a thorough cleaning of the grain. G G are brush-bars, which are located below the beaters and above the scraper E. These bars rest against the rubber or other springs $v\,v$ interposed between them and flanges $w\,w$ of the beater and scraper. They are held in position by screws. By this means I can get any desired adjustment of the brushes and let them out by reason of the elasticity of the springs as the brushes wear away. This also constitutes a special feature of my invention. The trunk consists of two parts, H and I, which are located outside of the body of the machine. The outer part H consists simply of a straight tube or passage, which is open at the bottom, and opens into the inner passage part way up. The inner passage I opens into the outer one at $z$ near the bottom, through which the cleaned grain from spouts $t\,u$ is delivered and is subjected to a final draught. This lower portion $a^1$ of the inner passage is cut off from the upper part $a^2$ of the same passage by a double inclined chute $b'\,b'$, which delivers the screenings that fall from above through valves $c'\,c'$, as clearly shown in Fig. 4. A shifting valve, $d'$, is located above the double chute, by which the screenings may be thrown to either side of the chute, as may be desired. At the top of the trunk is the port or passage $f'$, which opens into the jacket-space between the perforated cylinder and outer casing, by which the trunk gets the benefit of the exhaust from the fan, as indicated by the arrows. This special construction of the trunk by which the cleaned grain is separated in its passage from the screenings, and by which both get the benefit of the draught of air, I also believe to be new. K is an auxiliary air-trunk, which extends from the top of the main trunk in an arched form and opens over the hopper-opening $g'$ for admitting the uncleaned grain to the machine. This trunk has a hopper, $h'$, through which the grain is dropped. Much of the dirt is drawn backward through the arched trunk and carried off before the grain passes into the machine. The lower end of the spindle rests in a step, L, which screws up and down in the bridge-tree M. The top of the step is made hollow or concave, and serves as an oil-receptacle, which constantly lubricates the spindle. This step has a special relation to the spindle and beaters, as it enables them to be adjusted up and down with great exactness and with great nicety of gauge, which is essential in regulating the distance apart of the beaters and the consequent passage of the grain through. Ordinary steps would not answer, as they are not usually stable and reliable, and do not have the requisite nicety of adjustment. This feature also constitutes a part of my invention.

What I claim, and desire to secure by Letters Patent, is—

1. In a smut or grain-cleaner, the arrangement of the stationary beaters P and revolving beaters P′ provided with the corrugations $o\,o$ and $p'\,p'$ alternately in a vertical and circumferential direction, as herein described.

2. In a smut or grain-cleaner, the revolving beaters constructed, as described, with the rings $p\,p$, fans or beaters $q\,q$ with or without the fan or beaters $r\,r$, when operating in connection with the stationary beaters, substantially as described.

3. In a smut or grain-cleaner, the arrangement of the revolving beaters P′ provided with the hub $m$ and vertical rings $p\,p$, in combination with the fans $q\,q$ and beater P, as set forth.

4. In a smut or grain-cleaner, the arrangement of the exhaust-fan D, induction air-tube $e$, floor $s$, spouts $t\,u$, and scraper or fan E, all constructed and operating substantially as described.

5. In a smut or grain-cleaner, the arrangement of the brush-bars G G, springs $v\,v$, and their holding-screws and flanges $w$ of the fan or scraper E, constructed and operating as shown.

6. In a smut or grain-cleaner, the arrangement of the perforated cylinder B, made up of a series of sections and carrying the beaters P, in combination with the bolts $g$ and tube-sections $h$, all constructed substantially as described.

7. In a smut or grain-cleaner, the angle-irons

K K, in combination with the cylinder B, made up of a series of sections or rings, and united together by the bolts $g$ and sections $h$, substantially as and for the purpose set forth.

8. In a smut or grain-cleaner, the arrangement of the air-trunk, the same made of two parts, H and I, communicating at top and bottom, the interior part being also divided by the double chutes $b'$ $b'$, and having the swing-valve $d'$, and the whole communicating at the top by port $f'$ with the jacket-space between the perforated cylinder and outer casing, as herein described.

In witness whereof I have hereunto signed my name in the presence of two subscribing witnesses.

B. T. TRIMMER.

Witnesses:
   R. F. OSGOOD,
   ARCHD. BAINE.